US009430848B1

(12) United States Patent
Kulewski et al.

(10) Patent No.: US 9,430,848 B1
(45) Date of Patent: Aug. 30, 2016

(54) MONOCHROMATIC IMAGE DETERMINATION (71) Applicant: Google Inc., Mountain View, CA (US)

(72) Inventors: Krzysztof Kulewski, Sunnyvale, CA (US); Aravind Krishnaswamy, San Jose, CA (US); Sevket Derin Babacan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/475,196

(22) Filed: Sep. 2, 2014

(51) Int. Cl.
*G06K 9/00* (2006.01)
*G06T 7/40* (2006.01)
*G06K 9/46* (2006.01)

(52) U.S. Cl.
CPC ............. *G06T 7/408* (2013.01); *G06K 9/4642* (2013.01)

(58) Field of Classification Search
None
See application file for complete search history.

(56) References Cited

U.S. PATENT DOCUMENTS

| | | | |
|---|---|---|---|
| 6,195,458 B1 * | 2/2001 | Warnick | G06T 7/0081 348/700 |
| 7,925,083 B2 | 4/2011 | Johnson | |
| 8,417,028 B2 | 4/2013 | Sakaue | |
| 8,577,133 B2 | 11/2013 | Kong | |
| 2006/0088208 A1 * | 4/2006 | Nako | H04N 1/3878 382/162 |
| 2008/0187214 A1 * | 8/2008 | Shoda | H04N 1/486 382/162 |
| 2010/0104261 A1 * | 4/2010 | Liu | G11B 27/034 386/241 |
| 2010/0254597 A1 | 10/2010 | Yen et al. | |
| 2014/0168675 A1 | 6/2014 | Sato et al. | |

* cited by examiner

*Primary Examiner* — Feng Niu (57) ABSTRACT

Systems, methods and computer readable media for determination of monochromatic images are described. Some implementations can include a method. The method can include converting an image in a first colorspace to a first converted image in a second colorspace. The method can also include generating a hue histogram based on hue values in the converted image and determining a hue dispersion measure based on the hue histogram and a number of pixels in the image. The method can further include determining a hue clustering value based on the hue histogram and converting the image in the first colorspace into a second converted image in a third colorspace. The method can also include determining a variance measure based on the second converted image, and comparing the hue dispersion measure, the hue clustering value and the variance measure to a first threshold value, a second threshold value and a third threshold value, respectively.

16 Claims, 6 Drawing Sheets

MONOCHROMATIC IMAGE DETERMINATION

BACKGROUND

Images may be processed for various purposes (e.g., enhancing image quality by applying one or more image filters, operations or functions or adding one or more artistic effects). Some images may be monochromatic (e.g., grayscale, single color, or sepia). Some image processing operations may produce an undesirable result when applied to a monochromatic image, while other image processing operations may be suitable for performing on a monochromatic image. Prior to performing an image processing operation on an image it may be helpful to determine whether the image being processed is monochromatic.

SUMMARY

Some implementations relate generally to image processing, and more particularly to systems and methods for determining whether an image is monochromatic.

Some implementations can include a method. The method can include converting an image in a first colorspace to a first converted image in a second colorspace. The method can also include generating a hue histogram based on hue values in the converted image and determining a hue dispersion measure based on the hue histogram and a number of pixels in the image. The method can further include determining a hue clustering value based on the hue histogram and converting the image in the first colorspace into a second converted image in a third colorspace. The method can also include determining a variance measure based on the second converted image, and comparing the hue dispersion measure, the hue clustering value and the variance measure to a first threshold value, a second threshold value and a third threshold value, respectively. The method can also include providing an indication of whether the image is monochromatic based on one or more of the comparisons. In any of the implementations discussed herein, the second colorspace can be an HSV colorspace and the third colorspace can be a YCbCr colorspace.

Determining the hue dispersion measure can include projecting hue values onto a unit circle, wherein any pixel missing from the histogram is assigned to point (0,0) and computing a center of gravity for each plotted point. The method can also include iterating over plotted pixels on the unit circle and computing an intermediate value according to $(hx-x)^8+(hy-y)^8$ for each plotted pixel, and summing the intermediate values. The method can also include normalizing the sum of intermediate values, wherein the normalized result is the hue dispersion measure.

Determining the hue clustering value can include discarding hue histogram values within about 30 degrees from the largest hue histogram value and storing the largest histogram value as h, and a degree corresponding to the largest hue histogram value as m. The method can also include, when the largest histogram value h is not larger or equal to alpha*h, processing a next highest histogram value d that has not been discarded and increasing the hue clustering value of the image the degree distance between m and d on a circle. The method can further include iterating the processing until a high enough histogram value is reached.

Determining the variance measure can include building histograms of Cb and Cr values for each Y value, and summing corresponding variances per Y value. The method can also include multiplying image Cb and Cr variances, wherein the result of multiplication is the CbCr variance measure.

The image can include a video frame and the method can further include determining whether a plurality of images corresponding to a selected number of frames are monochromatic and merging results of the selected number of frames together to generate an indication of whether the video is monochromatic.

Some implementations can include a system comprising one or more computers configured to perform operations. The operations can include converting an image in a first colorspace to a first converted image in a second colorspace, and generating a hue histogram based on hue values in the converted image. The operations can also include determining a hue dispersion measure based on the hue histogram and a number of pixels in the image, and determining a hue clustering value based on the hue histogram. The operations can further include converting the image in the first colorspace into a second converted image in a third colorspace, and determining a variance measure based on the second converted image. The operations can also include comparing the hue dispersion measure, the hue clustering value and the variance measure to a first threshold value, a second threshold value and a third threshold value, respectively, and providing an indication of whether the image is monochromatic based on one or more of the comparisons.

The operation of determining the hue dispersion measure can include projecting hue values onto a unit circle, wherein any pixel missing from the histogram is assigned to point (0,0) and computing a center of gravity for each plotted point. The method can also include iterating over plotted pixels on the unit circle and computing an intermediate value according to $(hx-x)^8+(hy-y)^8$ for each plotted pixel, and summing the intermediate values. The method can also include normalizing the sum of intermediate values, wherein the normalized result is the hue dispersion measure.

The operation of determining the hue clustering value can include discarding hue histogram values within about 30 degrees from the largest hue histogram value and storing the largest histogram value as h, and a degree corresponding to the largest hue histogram value as m. The method can also include, when the largest histogram value h is not larger or equal to alpha* h, processing a next highest histogram value d that has not been discarded and increasing the hue clustering value of the image the degree distance between m and d on a circle. The method can further include iterating the processing until a high enough histogram value is reached.

The operation of determining the variance measure can include building histograms of Cb and Cr values for each Y value, and summing corresponding variances per Y value. The method can also include multiplying image Cb and Cr variances, wherein the result of multiplication is the CbCr variance measure.

The image can include a video frame and the operations can further include determining whether a plurality of images corresponding to a selected number of frames are monochromatic and merging results of the selected number of frames together to generate an indication of whether the video is monochromatic.

Some implementations can include a nontransitory computer readable medium having stored thereon software instructions that, when executed by a processor, cause the processor to perform operations. The operations can include converting an image in a first colorspace to a first converted image in a second colorspace, and generating a hue histogram based on hue values in the converted image. The operations can also include determining a hue dispersion measure based on the hue histogram and a number of pixels in the image, and determining a hue clustering value based on the hue histogram. The operations can further include converting the image in the first colorspace into a second converted image in a third colorspace, and determining a variance measure based on the second converted image. The operations can also include comparing the hue dispersion measure, the hue clustering value and the variance measure to a first threshold value, a second threshold value and a third threshold value, respectively, and providing an indication of whether the image is monochromatic based on one or more of the comparisons.

The operation of determining the hue dispersion measure can include projecting hue values onto a unit circle, wherein any pixel missing from the histogram is assigned to point (0,0) and computing a center of gravity for each plotted point. The method can also include iterating over plotted pixels on the unit circle and computing an intermediate value according to $(hx-x)^8+(hy-y)^8$ for each plotted pixel, and summing the intermediate values. The method can also include normalizing the sum of intermediate values, wherein the normalized result is the hue dispersion measure.

The operation of determining the hue clustering value can include discarding hue histogram values within about 30 degrees from the largest hue histogram value and storing the largest histogram value as h, and a degree corresponding to the largest hue histogram value as m. The method can also include, when the largest histogram value h is not larger or equal to alpha* h, processing a next highest histogram value d that has not been discarded and increasing the hue clustering value of the image the degree distance between m and d on a circle. The method can further include iterating the processing until a high enough histogram value is reached.

The operation of determining the variance measure can include building histograms of Cb and Cr values for each Y value, and summing corresponding variances per Y value. The method can also include multiplying image Cb and Cr variances, wherein the result of multiplication is the CbCr variance measure.

The image can include a video frame and the operations can further include determining whether a plurality of images corresponding to a selected number of frames are monochromatic and merging results of the selected number of frames together to generate an indication of whether the video is monochromatic.

DETAILED DESCRIPTION

Some implementations described herein can provide a method or system for determining whether an image is monochromatic (e.g., grayscale, single color, or sepia). By providing a determination that an image is monochromatic, some implementations can permit automatic photo enhancing software to select appropriate image processing filters or effects to apply to the monochromatic image. Information that photo is monochromatic can also be used to offer users the option of applying color filters such as colorize, recolorize, or sepia to the monochromatic image.

In general, some implementations detect monochromatic images by verifying whether a photo is of an almost single hue (in Hue Saturation Value or HSV colorspace) and of a single Cb/Cr value per Y (in YCbCr colorspace).

In some implementations, a method can include converting an image to an HSV colorspace and building a hue histogram that includes a number of bins (e.g., 360) corresponding to angular degree values of hue. Each bin can contain a count of the number of pixels with a given hue value. Pixels for which hue is undefined (e.g., the case when the saturation value is zero) may not be added to the histogram.

The method can include computing a first measure, hue dispersion, based on the hue histogram and the number of pixels in the image. The hue dispersion measure can be smaller if all the pixels have similar hue values and there are no grayscale pixels, or almost all pixels are grayscale. To determine the hue dispersion measure, hue values (corresponding to degrees from the histogram) are projected onto a unit circle. For all pixels missing in the histogram (corresponding to undefined hue values), point (0, 0) is used. The center of gravity (hx, hy) of all plotted points is computed. Hue dispersion can be computed, for example, by iterating over plotted pixels (x, y) on the unit circle and computing $(hx-x)^8+(hy-y)^8$ for each of them, then summing these values. Hue dispersion can be normalized, for example, by dividing the sum of the values by the number of pixels in the image.

The method can also include computing a second measure, the hue clustering value, based on the hue histogram. The hue clustering value can be used to determine whether there are no large hue clusters far away from the main hue cluster. The hue clustering value can ignore grayscale pixels. If the hue histogram is empty (e.g., all pixels have undefined hue values) the hue clustering value is zero, and therefore the image is grayscale. First, histogram values within 30 degrees from the largest histogram value are discarded. The largest histogram value is stored as h, and the degree corresponding to this value is stored as m. Next highest not discarded histogram value (corresponding to degree d) is processed if the histogram value is larger or equal to alpha*h. For example, alpha can be about 1/4000. The hue clustering value of the image can be increased by the degree distance between m and d on a circle. For example, values within about 3 degrees from d in the image can be discarded. This step can be iterated until a high enough histogram value is reached.

The method can also include converting the image to the YCbCr colorspace and computing a third measure, the CbCr variance. The CbCr variance measure is based on the notion that in an ideal monochromatic image there should be a single Cb and single Cr value per every Y value. For each Y value, histograms of Cb and Cr values are built. Image Cb and Cr variances are computed by summing corresponding variances per Y values. The CbCr variance measure is computed by multiplying image Cb and Cr variances.

The method can also include determining the image is monochromatic, for example, when the hue dispersion is lower than about 0.3, hue clustering value is lower than about 1300 and CbCr variance is lower than about 800. It will be appreciated that other threshold values for the three measures can be used. Also, processing can be terminated when any one of the measure does not meet the threshold for a monochromatic image. For example, if the first measure computed for an image does not meet the threshold for a monochromatic image, the processing can be terminated early for that image and the image can be determined to not be monochromatic.

In some implementations, a similar method to that described herein can be used to determine that a video is monochromatic by computing the three measures for a selected number of video frames and then merging the individual frame results together to make a determination about whether the video is monochromatic.

Figure 1:
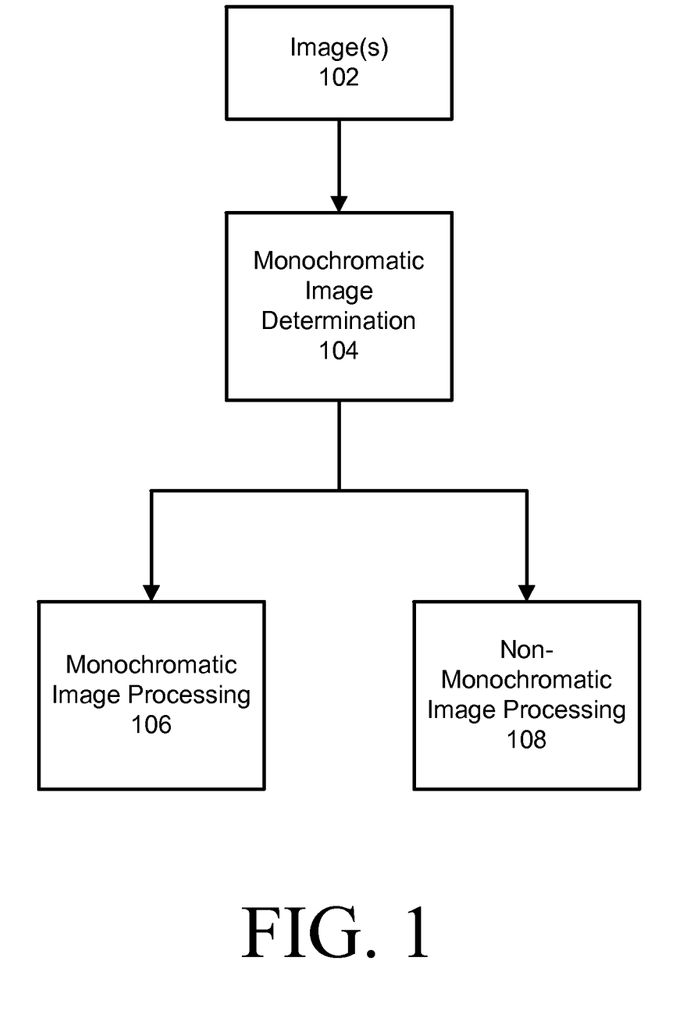
FIG. 1 shows an example system for monochromatic image determination in accordance with some implementations.

FIG. 1 shows an example system for monochromatic image determination in accordance with some implementations. One or more images 102 can be provided to a monochromatic image determination unit, module, section or system 104. The monochromatic image determination system 104 can perform operations (e.g., as described below in connection with FIGS. 2-5) to determine whether one or more of the images 102 are monochromatic.

If an image is determined by the monochromatic image determination system 104 to be monochromatic, monochromatic image processing 106 can be optionally performed. If an image is determined by the monochromatic image determination system 104 to not be monochromatic, non-monochromatic image processing 108 can optionally be performed. Also, the monochromatic image determination system 104 can provide an indication of whether an image is monochromatic as output.

Figure 2:
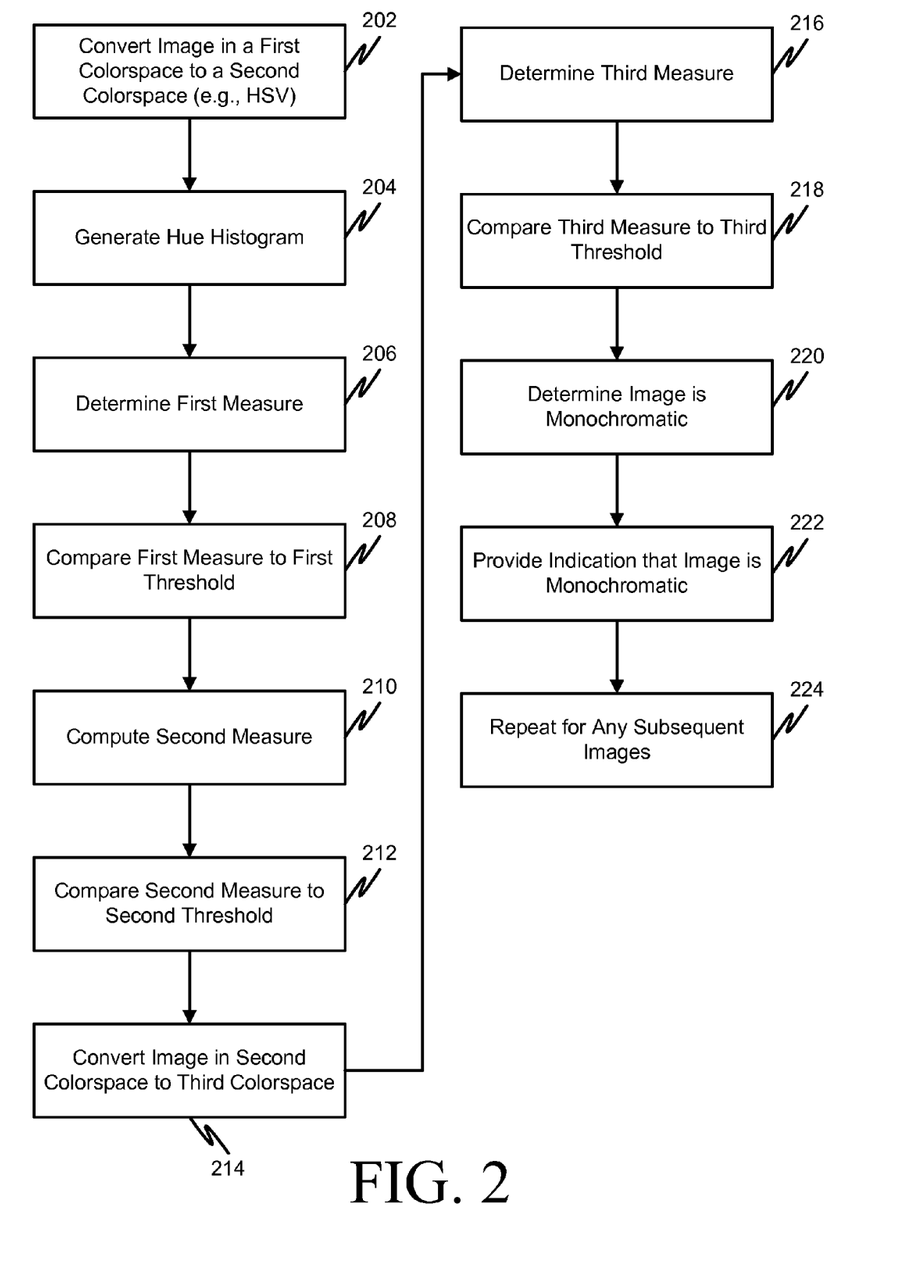
FIGS. 2-5 are flow charts of an example monochromatic image determination process in accordance with some implementations.

FIG. 2 is a flow chart of an example monochromatic image determination process 200 in accordance with some implementations. Processing begins at 202, where an image in a first colorspace is converted to a second colorspace (e.g., HSV). Processing continues to 204.

At 204, a hue histogram is generated. For example, the hue histogram can include a number of bins (e.g., 360) corresponding to angular degree values of hue. Each bin can contain a count of the number of pixels with a given hue value. Pixels for which hue is undefined (e.g., the case when the saturation value is zero) may not be added to the histogram. Processing continues to 206.

At 206, a first measure is determined. For example, the first measure can be a hue dispersion measure based on the hue histogram and the number of pixels in the image. The hue dispersion measure can have a smaller when all the pixels have similar hue values and there are no grayscale pixels, or when almost all pixels are grayscale. Details of determining the hue dispersion measure are provided in FIG. 3 and its corresponding description below. Processing continues to 208.

At 208, the first measure is compared to a first threshold. For example, the hue dispersion measure can be compared to a first threshold value of about 0.3. If the hue dispersion measure is equal to or above the first threshold, then processing may end with a determination that the image is not likely to be monochromatic based on the comparison of the first measure to the first threshold value. If the hue dispersion measure is below the first threshold, then processing continues to 210.

At 210, a second measure is computed. For example, the second measure can be a hue clustering value based on the hue histogram. The hue clustering value can be used to determine whether there are no large hue clusters far away from the main hue cluster. The hue clustering value can ignore grayscale pixels. If the hue histogram is empty (e.g., all pixels have undefined hue values) the hue clustering value is zero, and therefore the image is grayscale. Details on determining the hue clustering value are provided in FIG. 4 and its corresponding description below. Processing continues to 212.

At 212, the second measure is compared to a second threshold. For example, the hue clustering value can be compared to second threshold value of about 1300. If the hue clustering value is equal to or above the second threshold, then processing may end with a determination that the image is not likely to be monochromatic based on the comparison of the second measure to the second threshold value. If the hue clustering value is below the second threshold, then processing continues to 214.

At 214, the image is converted into a third colorspace. For example, the HSV image is converted into a YCbCr colorspace. Processing continues to 216.

At 216, a third measure is determined. For example, the third measure can be a CbCr variance measure. The CbCr variance measure may be based on the notion that in an ideal monochromatic image there should be a single Cb and single Cr value per every Y value. Details of determining the CbCr variance measure are provided in FIG. 5 and its corresponding description below. Processing continues to 218.

At 218, the third measure is compared to a third threshold value. For example, the CbCr variance measure may be compared to a third threshold value of about 800. If the CbCr variance value is equal to or above the third threshold, then processing may end with a determination that the image is not likely to be monochromatic based on the comparison of the third measure to the third threshold value. If the CbCr variance value is below the third threshold, then processing continues to 220.

At 220, the image is determined to be monochromatic. Downstream processing can be based on the determination that the image is (or is not) monochromatic. Processing continues to 222.

At 222, an indication that the image is monochromatic is optionally provided. For example, an image processing server may provide an indication to another image processing system (e.g., on a user device) that an image has been determined to be monochromatic. In another example, a monochromatic determination unit may provide an indication to an image processing system that an image has been determined to be monochromatic. Processing continues to 224.

At 224, 202-222 are optionally repeated for any subsequent images for which a monochromatic determination is needed or has been requested.

It will be appreciated that 202-224 can be repeated in whole or in part in order to accomplish a monochromatic image determination task.

Figure 3:
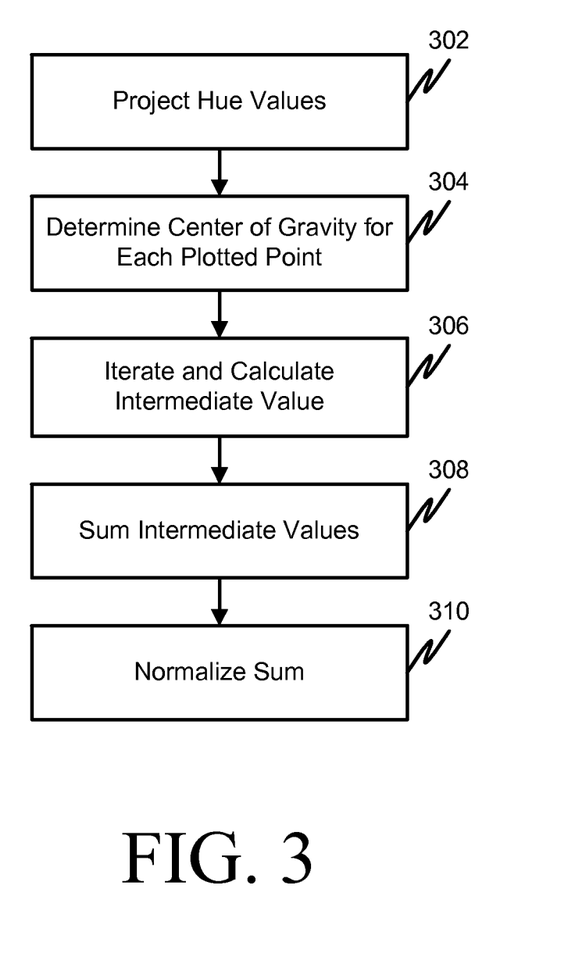

FIG. 3 is a flow chart of an example monochromatic image determination process showing details of an example hue dispersion measure determination (e.g., 206 described above) in accordance with some implementations. Processing begins at 302, where hue values (e.g., values corresponding to degrees from the hue histogram) are projected onto a unit circle. For all pixels missing in the histogram (corresponding to undefined hue values), point (0, 0) can be used. Processing continues to 304.

At 304, the center of gravity (hx, hy) of all plotted points is computed. Processing continues to 306.

At 306, the range of plotted pixels (x, y) on the unit circle can be iterated over an intermediate value can be computed for each plotted point. For example, the intermediate values can be computed according to $(hx-x)^8+(hy-y)^8$ (or the "8 power mean"). It will be appreciated that other intermediate value formulas or techniques could be used. For example, the intermediate value computation could use a power other than 8, Cartesian distance could be used, and 2nd power or the like could be used. Processing continues to 308.

At 308, the intermediate values are summed. Processing continues to 310.

At 310, the sum can be normalized to yield the hue dispersion value. For example, the sum can be normalized by dividing the sum of the values by the number of pixels in the image.

It will be appreciated that 302-310 can be repeated in whole or in part in order to accomplish a monochromatic image determination task.

Figure 4:
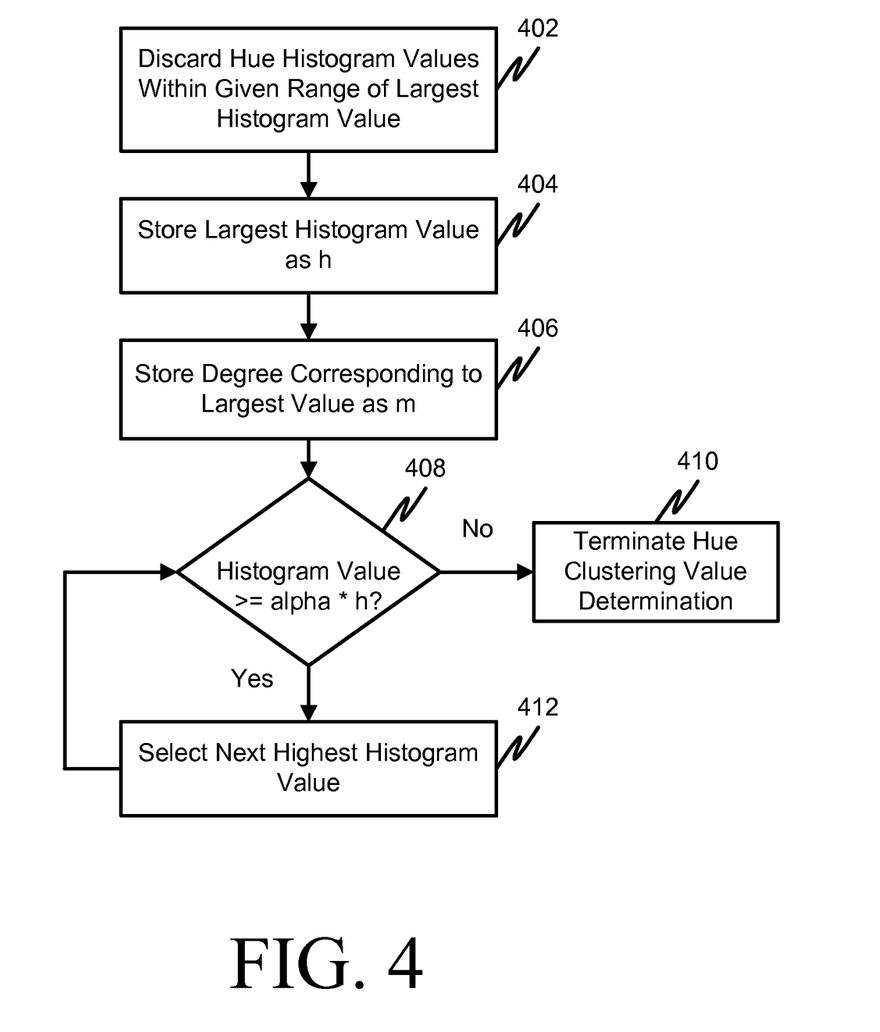

FIG. 4 is a flow chart of an example monochromatic image determination process showing details of an example hue clustering value determination (e.g., 210 described above) in accordance with some implementations. Processing begins at 402, where histogram values within a given range of the largest histogram value are discarded. For example, histogram values within 30 degrees from the largest histogram value can be discarded. Processing continues to 404.

At 404, the largest histogram value can be stored as h. Processing continues to 406.

At 406, the degree corresponding to the largest value is stored as m. Processing continues to 408.

At 408, the histogram value is compared to alpha*h. If the histogram value is greater than or equal to alpha*h, processing continues to 412. Otherwise, processing continues to 410.

At 410, processing for determining hue clustering value terminates.

At 412, a next highest, not discarded histogram value (corresponding to degree d) is processed. For example, alpha can be about 1/4000. The hue clustering value of the image can be increased by the degree distance between m and d on a circle. For example, values within about 3 degrees from d in the image can be discarded. Step 412 can be iterated until a high enough histogram value is reached.

It will be appreciated that 402-412 can be repeated in whole or in part in order to accomplish a monochromatic image determination task.

Figure 5:
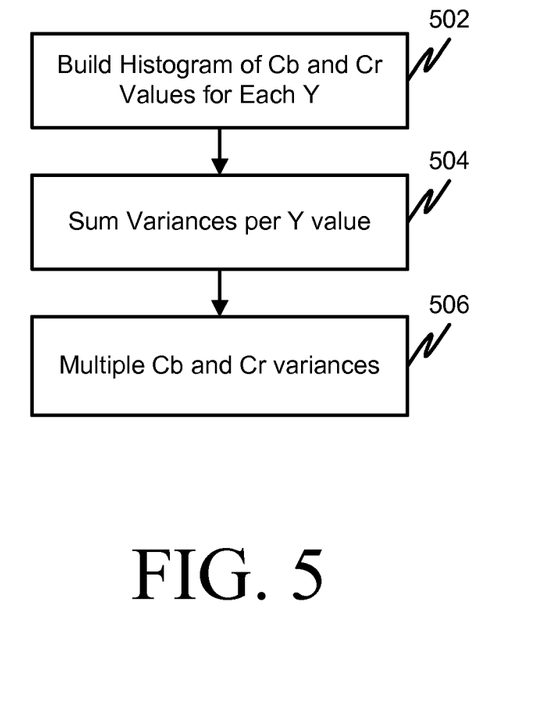

FIG. 5 is a flow chart of an example monochromatic image determination process in accordance with some implementations. Processing begins at 502, where for each Y value, histograms of Cb and Cr values are built. Processing continues to 504.

At 504, image Cb and Cr variances are computed by summing corresponding variances per Y values. Processing continues to 506.

At 506, the CbCr variance measure is computed by multiplying image Cb and Cr variances.

It will be appreciated that 502-506 can be repeated in whole or in part in order to accomplish a monochromatic image determination task.

In addition to, or as an alternative to, the steps mentioned above, some implementations can include one or more of the following. Starting from any colorspace (e.g., RGB, HSV, or YCbCr) and performing any necessary conversions that may be missing and needed prior to beginning the monochromatic determination process to place an image into the appropriate colorspace for processing. It will be appreciated that the HSV and YCbCr portions can be performed in any order. Also, it will be appreciated the different angle values could be used in the discarding step (e.g., 402) of the hue clustering value determination.

It will be appreciated that a different alpha value could be used. Also, it will be appreciated that different threshold values for each of the three measures could be used.

Figure 6:
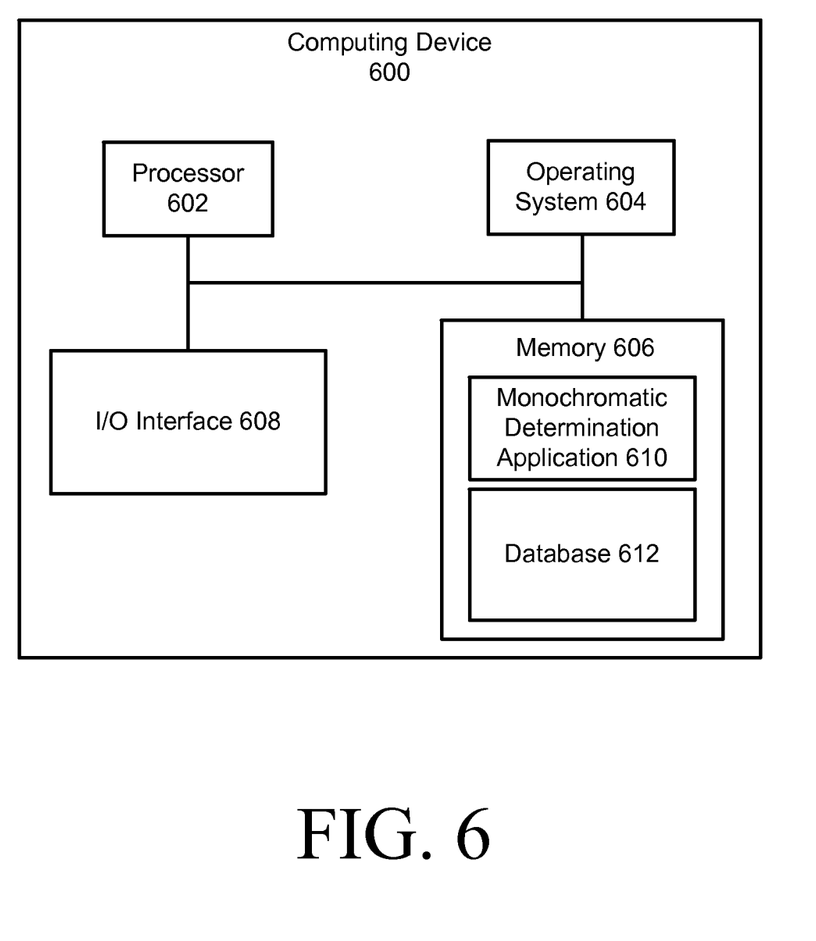
FIG. 6 is a diagram of an example computer system configured for monochromatic image determination in accordance with some implementations.

FIG. 6 is a diagram of an example computing system (e.g., server or user device) 600 that can be configured for monochromatic image determination in accordance with some implementations. The computing system 600 includes a processor 602, operating system 604, memory 606 and I/O interface 608. The memory 606 can include a monochromatic image determination application 610 and a database 612.

In operation, the processor 602 may execute the monochromatic image determination application 610 stored in the memory 606. The monochromatic image determination application 610 can include software instructions that, when executed by the processor, cause the processor to perform operations for monochromatic image determination in accordance with the present disclosure (e.g., the monochromatic image determination application 610 can cause the processor to perform one or more of steps 202-224, 302-310, 402-412 and 502-506 described above and, in conjunction, can access the database 612). The monochromatic image determination application 610 can also operate in conjunction with the operating system 604.

The monochromatic image determination computing device (e.g., 300) can include, but is not limited to, a single processor system, a multi-processor system (co-located or distributed), a cloud computing system, or a combination of the above.

The client (or user) device(s) can include, but are not limited to, a desktop computer, a laptop computer, a portable computer, a tablet computing device, a smartphone, a feature phone, a personal digital assistant, a media player, televisions, an electronic book reader, an entertainment system of a vehicle or the like. Also, user devices can include wearable computing devices (e.g., glasses, watches and the like), furniture mounted computing devices and/or building mounted computing devices.

Some user devices can be connected to an image processing system via a network. The network connecting user devices to the image processing system can be a wired or wireless network, and can include, but is not limited to, a WiFi network, a local area network, a wide area network, the Internet, or a combination of the above.

The data storage, memory and/or computer readable medium can be a nontransitory medium such as a magnetic storage device (hard disk drive or the like), optical storage device (CD, DVD or the like), or electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or nontransitory computer readable media having stored instructions for monochromatic image determination as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for determination of a monochromatic image.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
converting an image in a first colorspace to a first converted image in a second colorspace;
generating a hue histogram based on hue values in the converted image;
determining a hue dispersion measure based on the hue histogram and a number of pixels in the image;
determining a hue clustering value based on the hue histogram;
converting the image in the first colorspace into a second converted image in a third colorspace;
determining a variance measure based on the second converted image;
comparing the hue dispersion measure, the hue clustering value and the variance measure to a first threshold value, a second threshold value and a third threshold value, respectively; and
providing an indication of whether the image is monochromatic based on one or more of the comparisons,
wherein determining the hue dispersion measure includes:
projecting hue values onto a unit circle, wherein any pixel missing from the histogram is assigned to point (0,0);
computing a center of gravity for plotted pixels;
iterating over plotted pixels on the unit circle and computing an intermediate value according to $(hx-x)^8 + (hy-y)^8$ for each plotted pixel;
summing the intermediate values; and
normalizing the sum of intermediate values, wherein the normalized result is the hue dispersion measure.

2. The method of claim 1, wherein the second colorspace is an HSV colorspace.

3. The method of claim 1, wherein the third colorspace is a YCbCr colorspace.

4. The method of claim 3, wherein determining the variance measure includes:
building histograms of Cb and Cr values for each Y value;
summing corresponding variances per Y value; and
multiplying image Cb and Cr variances, wherein the result of multiplication is the CbCr variance measure.

5. The method of claim 1, wherein determining the hue clustering value includes:
discarding hue histogram values within about 30 degrees from the largest hue histogram value;
storing the largest hue histogram value as h, and a degree corresponding to the largest hue histogram value as m;
when a next largest hue histogram value is larger or equal to alpha*h, processing the next largest histogram value that has not been discarded and increasing the hue clustering value of the image the degree distance between m and a degree d of the next largest hue histogram value on a circle; and
iterating the processing until a next largest hue histogram value is reached that is not greater than or equal to alpha*h.

6. The method of claim 1, wherein the image is a video frame and the method further includes determining whether a plurality of images corresponding to a selected number of frames are monochromatic and merging results of the selected number of frames together to generate an indication of whether the video is monochromatic.

7. A system comprising one or more computers configured to perform operations including:
converting an image in a first colorspace to a first converted image in a second colorspace;
generating a hue histogram based on hue values in the converted image;
determining a hue dispersion measure based on the hue histogram and a number of pixels in the image;
determining a hue clustering value based on the hue histogram;
converting the image in the first colorspace into a second converted image in a third colorspace;
determining a variance measure based on the second converted image;
comparing the hue dispersion measure, the hue clustering value and the variance measure to a first threshold value, a second threshold value and a third threshold value, respectively; and
providing an indication of whether the image is monochromatic based on one or more of the comparisons,
wherein determining the hue clustering value includes:
discarding hue histogram values within about 30 degrees from the largest hue histogram value;
storing the largest hue histogram value as h, and a degree corresponding to the largest hue histogram value as m;
when a next largest hue histogram value is larger or equal to alpha*h, processing the next largest histogram value that has not been discarded and increasing the hue clustering value of the image the degree distance between m and a degree d of the next largest hue histogram value on a circle; and
iterating the processing until a next largest hue histogram value is reached that is not greater than or equal to alpha*h.

8. The system of claim 7, wherein the second colorspace is an HSV colorspace.

9. The system of claim 7, wherein the third colorspace is a YCbCr colorspace.

10. The system of claim 9, wherein determining the variance measure includes:
building histograms of Cb and Cr values for each Y value;
summing corresponding variances per Y value; and
multiplying image Cb and Cr variances, wherein the result of multiplication is the CbCr variance measure.

11. The system of claim 7, wherein determining the hue dispersion measure includes:
projecting hue values onto a unit circle, wherein any pixel missing from the histogram is assigned to point (0,0);
computing a center of gravity for each plotted point;
iterating over plotted pixels on the unit circle and computing an intermediate value according to $(hx-x)^8 + (hy-y)^8$ for each plotted pixel;
summing the intermediate values; and
normalizing the sum of intermediate values, wherein the normalized result is the hue dispersion measure.

12. The system of claim 7, wherein the image is a video frame and the method further includes determining whether a plurality of images corresponding to a selected number of frames are monochromatic and merging results of the selected number of frames together to generate an indication of whether the video is monochromatic.

13. A nontransitory computer readable medium having stored thereon software instructions that, when executed by a processor, cause the processor to perform operations including:
converting an image in a first colorspace to a first converted image in a second colorspace;

generating a hue histogram based on hue values in the converted image;
determining a hue dispersion measure based on the hue histogram and a number of pixels in the image;
determining a hue clustering value based on the hue histogram;
converting the image in the first colorspace into a second converted image in a third colorspace;
determining a variance measure based on the second converted image;
comparing the hue dispersion measure, the hue clustering value and the variance measure to a first threshold value, a second threshold value and a third threshold value, respectively; and
providing an indication of whether the image is monochromatic based on one or more of the comparisons,
wherein the third color space is a YCbCr color space, and wherein determining the variance measure includes:
building histograms of Cb and Cr values for each Y value;
summing corresponding variances per Y value; and
multiplying image Cb and Cr variances, wherein the result of multiplication is the CbCr variance measure.

14. The nontransitory computer readable medium of claim 13, wherein the second colorspace is an HSV colorspace.

15. The nontransitory computer readable medium of claim 13, wherein determining the hue dispersion measure includes:

projecting hue values onto a unit circle, wherein any pixel missing from the histogram is assigned to point (0,0);
computing a center of gravity for each plotted point;
iterating over plotted pixels on the unit circle and computing an intermediate value according to $(hx-x)^8 + (hy-y)^8$ for each plotted pixel;
summing the intermediate values; and
normalizing the sum of intermediate values, wherein the normalized result is the hue dispersion measure.

16. The nontransitory computer readable medium of claim 13, wherein determining the hue clustering value includes:
discarding hue histogram values within about 30 degrees from the largest hue histogram value;
storing the largest hue histogram value as h, and a degree corresponding to the largest hue histogram value as m;
when a next largest hue histogram value is larger or equal to alpha*h, processing the next largest histogram value that has not been discarded and increasing the hue clustering value of the image the degree distance between m and a degree d of the next largest hue histogram value on a circle; and
iterating the processing until a next largest hue histogram value is reached that is not greater than or equal to alpha*h.

* * * * *